(12) United States Patent
Miller et al.

(10) Patent No.: US 8,021,750 B2
(45) Date of Patent: *Sep. 20, 2011

(54) INSULATED PANEL FOR MINE SAFE ROOMS

(75) Inventors: Douglas J. Miller, North Olmsted, OH (US); Richard L. Shao, North Royalton, OH (US); Mark Segger, Strongsville, OH (US); Yevegiy P. Griffin, Macedonia, OH (US)

(73) Assignee: GrafTech International Holdings Inc., Parma, OH (US)

( * ) Notice: Subject to any disclaimer, the term of this patent is extended or adjusted under 35 U.S.C. 154(b) by 235 days.

This patent is subject to a terminal disclaimer.

(21) Appl. No.: 11/773,099

(22) Filed: Jul. 3, 2007

(65) Prior Publication Data

US 2008/0060282 A1    Mar. 13, 2008

Related U.S. Application Data

(63) Continuation-in-part of application No. 10/970,352, filed on Oct. 21, 2004, now Pat. No. 7,527,855.

(51) Int. Cl.
B32B 9/00    (2006.01)
(52) U.S. Cl. .................. 428/408; 423/447.1
(58) Field of Classification Search .......... 428/408; 423/447.1, 447.3
See application file for complete search history.

(56) References Cited

U.S. PATENT DOCUMENTS

| | | | |
|---|---|---|---|
| 3,302,399 A | 2/1967 | Tini et al. | 60/39.7 |
| 3,309,437 A | 3/1967 | Harnett | 264/29 |
| 3,342,555 A * | 9/1967 | McMillan | 423/445 R |
| 3,387,940 A * | 6/1968 | McHenry et al. | 423/448 |
| 3,441,529 A | 4/1969 | Tyler | 260/19 |
| 3,632,385 A | 1/1972 | Schmitt et al. | 117/46 |
| RE28,574 E | 10/1975 | Ruoff | 425/78 |
| 3,960,761 A | 6/1976 | Burger et al. | 252/421 |
| 4,163,349 A | 8/1979 | Smith | 52/241 |
| 4,190,637 A | 2/1980 | Kennedy | 423/448 |
| 4,205,055 A | 5/1980 | Maire et al. | 423/445 |
| 4,276,246 A | 6/1981 | Bonzom et al. | 264/53 |
| 4,361,613 A * | 11/1982 | Bogner et al. | 428/119 |
| 4,425,396 A | 1/1984 | Hartman | 428/220 |
| 4,619,796 A | 10/1986 | Awata et al. | 264/29.4 |
| 4,628,650 A | 12/1986 | Parker | 52/265 |
| 4,681,718 A | 7/1987 | Oldham | 264/102 |
| 4,816,511 A | 3/1989 | Castonguay et al. | 524/496 |
| 4,851,280 A | 7/1989 | Gupta | 428/246 |
| 4,874,648 A * | 10/1989 | Hill et al. | 428/35.9 |
| 4,879,182 A | 11/1989 | Presswood et al. | 428/408 |
| 4,966,919 A | 10/1990 | Williams, Jr. et al. | 521/54 |

(Continued)

OTHER PUBLICATIONS

GB-263—Advanced Structural Carbons: Fibers, Foams and Composites, pp. 43-51.

(Continued)

*Primary Examiner* — David R Sample
*Assistant Examiner* — Daniel Miller
(74) *Attorney, Agent, or Firm* — Waddey & Patterson, P.C.; James R. Cartiglia

(57) ABSTRACT

A structural insulated panel for use in a mine safe room, which includes a carbon foam core having a high ratio of compressive strength to density, desirable fire retardant properties, and resistance to environmental stress. The carbon foam structural insulated panel also includes a first layer and a second layer bound to a first surface and second surface of the carbon foam core.

11 Claims, 1 Drawing Sheet

U.S. PATENT DOCUMENTS

| | | | | |
|---|---|---|---|---|
| 4,992,254 | A | 2/1991 | Kong | 423/449 |
| 5,002,981 | A | 3/1991 | Chiu | 523/141 |
| 5,047,225 | A | 9/1991 | Kong | 423/447.2 |
| 5,173,515 | A * | 12/1992 | von Bonin et al. | 521/103 |
| 5,211,786 | A | 5/1993 | Enloe et al. | 156/89 |
| 5,280,063 | A | 1/1994 | Lewis et al. | 524/594 |
| 5,282,734 | A | 2/1994 | Pastureau et al. | 425/393 |
| 5,358,802 | A | 10/1994 | Mayer et al. | 429/218 |
| 5,439,864 | A | 8/1995 | Rosin et al. | 502/180 |
| 5,648,027 | A | 7/1997 | Tajiri et al. | 264/43 |
| 5,686,038 | A | 11/1997 | Christensen et al. | 264/257 |
| 5,709,893 | A | 1/1998 | McCarville et al. | 425/389 |
| 5,730,915 | A | 3/1998 | Cornie | 264/29.1 |
| 5,868,974 | A | 2/1999 | Kearns | 264/29.6 |
| 5,888,469 | A | 3/1999 | Stiller et al. | 423/445 |
| 5,937,932 | A | 8/1999 | Cornie | 164/526 |
| 5,945,084 | A | 8/1999 | Droege | 423/447.4 |
| 5,961,814 | A | 10/1999 | Kearns | 208/39 |
| 5,984,256 | A | 11/1999 | Endo | 249/114.1 |
| 6,024,555 | A | 2/2000 | Goodridge et al. | 425/394 |
| 6,033,506 | A | 3/2000 | Klett | 156/78 |
| 6,079,175 | A | 6/2000 | Clear | 52/404.1 |
| 6,093,245 | A | 7/2000 | Hammond et al. | 117/200 |
| 6,099,792 | A | 8/2000 | Ganguli et al. | 264/621 |
| 6,103,149 | A | 8/2000 | Stankiewicz | 264/29.1 |
| 6,183,854 | B1 | 2/2001 | Stiller et al. | 428/312.2 |
| 6,214,158 | B1 | 4/2001 | Chiu et al. | 156/314 |
| 6,217,800 | B1 | 4/2001 | Hayward | 264/29.1 |
| 6,241,957 | B1 | 6/2001 | Stiller et al. | 423/448 |
| 6,323,160 | B1 | 11/2001 | Murdie et al. | 508/109 |
| 6,344,159 | B1 | 2/2002 | Klett | 264/29.7 |
| 6,346,226 | B1 | 2/2002 | Stiller et al. | 423/448 |
| 6,387,343 | B1 | 5/2002 | Klett | 423/448 |
| 6,399,149 | B1 | 6/2002 | Klett et al. | 427/230 |
| 6,482,520 | B1 * | 11/2002 | Tzeng | 428/408 |
| 6,506,354 | B1 | 1/2003 | Stiller et al. | 423/445 |
| 6,576,168 | B2 | 6/2003 | Hardcastle et al. | 264/29.1 |
| 6,588,172 | B2 | 7/2003 | Porter | 52/794.1 |
| 6,599,621 | B2 | 7/2003 | Porter | 428/322.2 |
| 6,656,238 | B1 | 12/2003 | Rogers et al. | 44/620 |
| 6,656,858 | B1 | 12/2003 | Cahill | 442/370 |
| 6,725,616 | B1 | 4/2004 | Pease | 52/309.7 |
| 6,776,936 | B2 | 8/2004 | Hardcastle et al. | 264/29.1 |
| 6,849,098 | B1 | 2/2005 | Joseph et al. | 44/620 |
| 6,892,507 | B1 | 5/2005 | Pease | 52/794.1 |
| 7,232,606 | B2 | 6/2007 | Shao et al. | 428/317.3 |
| 7,264,878 | B2 | 9/2007 | Miller et al. | 428/408 |
| 2002/0038864 | A1 | 4/2002 | Hirohata et al. | |
| 2002/0190414 | A1 | 12/2002 | Hardcastle et al. | |
| 2003/0071384 | A1 | 4/2003 | Rogers | |
| 2005/0079355 | A1 | 4/2005 | Clovesko et al. | |
| 2006/0014908 | A1 | 1/2006 | Rotermund et al. | |
| 2006/0083673 | A1 | 4/2006 | Morgan et al. | |
| 2006/0086043 | A1 | 4/2006 | Miller et al. | |
| 2006/0240241 | A1 | 10/2006 | Chang et al. | |
| 2007/0110985 | A1 | 5/2007 | Miller et al. | |
| 2007/0155847 | A1 | 7/2007 | Miller et al. | |
| 2008/0008883 | A1 * | 1/2008 | Miller et al. | 428/408 |

OTHER PUBLICATIONS

Characterization Requirements for Aerospace Thermal Management Applications, Brow et al.

Aztex X-Cor, High Performance Damage Tolerant Composite Core Material, Oct. 2002.

University of West Virginia, Low Graphitization Insulating Foams.

Touchstone Patents—Low Graphitization Insulating Foams.

Ultramet—Low Graphitization Insulating Foams.

Touchstone Research Laboratory Ltd., Product Data Sheet: CFOAM Carbon Foams, Rev8-0803.

ORNL High Thermal Conductivity Graphite Foams.

Carbon Graphite Foams at MER Corporation.

POCO Graphite Foam, Properties and Characteristics, Jun. 29, 2001.

High-Performance Composites, Sep. 2004, p. 25.

Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, p. 206 and 207.

Preparation and Graphitization of High-Performance Carbon Foams from Coal, by Rogers, et al., Touchstone Research Laboratory, Ltd, Jul. 2001.

Low-Cost Carbon Foams for Thermal Protection and Reinforcement Applications, by Rogers, et al., Touchstone Research Laboratory, pp. 293-305.

Coal-Based Carbon Foam for High Temperature Applications, Dwayne R. Morgan, Touchstone Research Laboratory, Inc.

Precursor Effects on Graphite Foams, Cooling Power Electronics Using Graphite Foams, ORNL Carbon and Graphite Foams.

High Thermal Conductivity, Mesophase Pitch-Derived Carbon Foam, 43rd International SAMPE Symposium, May 31-Jun. 4, 1998, pp. 745, 746.

Microcellular Pitch-Based Carbon Foams Blown with Helium Gas, Anderson, et al., 43rd International SAMPE Symposium, May 31-Jun. 4, 1998, pp. 756, 758, and 760.

High Thermal Conductivity Graphite Foam—Progress and Opportunities, by Wiechmann, et al., Composite Optics, Inc.

Performance of Alternate Precursors for Graphite Foam, by James Klett and Claudia Walls, Oak Ridge National Laboratory.

Japanese article Structural and thermal characteristics of highly graphitizable AR-Foam by Fumitaka Watanabe and Isao Mochida, 2004.

"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.

Kirk-Othmer, Encyclopedia of Chemical Technology, 4th ed., vol. 6, John Wiley & Sons, Application of Coal Petrology and Petrography, pp. 429-434 and 454-455, 1993.

WO 2006/076556, publication date Jul. 20, 2006.

* cited by examiner

US 8,021,750 B2

INSULATED PANEL FOR MINE SAFE ROOMS

RELATED APPLICATIONS

This application is a continuation-in-part of copending and commonly assigned U.S. patent application Ser. No. 10/970,352, entitled "High Strength Monolithic Carbon Foam," filed Oct. 21, 2004 in the names of Douglas J. Miller, Irwin C. Lewis and Robert A. Mercuri; copending and commonly assigned U.S. patent application Ser. No. 11/314,975, entitled "Carbon Foam Structural Insulated Panel," filed Dec. 21, 2005 in the names of Douglas J. Miller, Yevgeniy Griffin and Mark Segger; and copending and commonly assigned U.S. patent application Ser. No. 11/407,356, entitled "Insulated Panel For Mine Safe Rooms," filed Apr. 19, 2006 in the names of Douglas J. Miller, Richard L. Shao, Mark Segger and Yevgeniy P. Griffin, the disclosures of each of which are incorporated herein by reference.

BACKGROUND OF THE INVENTION

1. Technical Field

The present invention relates to high strength structural panels useful for mine safe rooms, that is, chambers within mines where miners can retreat in an emergency, and where food, supplies, stores of oxygen, etc. are maintained. More particularly, the present invention relates to the use of carbon foam in structural insulated panels which are highly resistant to heat, moisture, and other environmental stresses while maintaining an extremely high compressive strength, thus providing a safe haven for trapped miners.

2. Background Art

Mine safety is becoming an increasingly important topic, especially as explosions and other emergency events have taken the lives of miners. One suggested safety measure for miners in the event of an emergency is the provision of so-called mine safe rooms. Mine safe rooms are structures within mines to which miners can retreat in the event an emergency or other situation prevents the miners from escaping to the surface. Mine safe rooms are sealed off from toxic gases which may collect after a fire or explosion, usually contain communications means, and are stocked with supplies, such as food, water and oxygen, to provide a safe haven for miners while they await rescue.

Current mine safe room technology has the walls of the safe room constructed of steel or other metal. While steel can provide blast protection, shielding miners from explosions, steel can do little to protect the miners from the heat generated by an explosion or resulting fire. Indeed, in the event of fire, mine safe rooms formed of steel can exacerbate the situation, because of the thermal conductivity of steel. Thus, the present invention relates to the formation of mine safe rooms using structural insulated panels which comprise carbon foam. While structural insulated panels (referred to in the industry as SIPs) are known, forming SIPs with a carbon foam core is not.

In Hardcastle et al. (U.S. Pat. No. 4,425,396) an insulating panel is disclosed with a synthetic organic polymeric foam with protective weathering layers comprised of multiple thermoplastic sheets.

Cahill (U.S. Pat. No. 6,656,858) describes a lightweight laminate wall comprised of a low density layer of from about 0.5 to 3 pounds per cubic foot and a second, reinforcing layer of a polymeric fabric. These structures are lightweight, have a low moisture resistance and meet building code requirements regarding transverse wind loading.

Porter (U.S. Pat. No. 6,599,621) describes a SIP with high strength and resistance to fire and particularly to water and changes in humidity. The disclosed structures are comprised of an inner insulating core with a gypsum fiberboard on one face of the insulating core and an oriented strand board on the second face of the insulating core. Preferably, the insulating core is comprised of a plastic foam such as expanded polystyrene or urethane which is bonded to both the gypsum fiberboard and the oriented strand board.

Porter (U.S. Pat. No. 6,588,172) describes the incorporation of a laminated layer of plastic impregnated paper into a SIP to increase the panel's tensile strength while rendering it impervious to moisture. This layer is typically situated between the gypsum board and plastic foam core, adhered through a conventional bonding agent.

Parker (U.S. Pat. No. 4,628,650) describes a SIP with a foam core with a layer having an overhang projecting from the foam core edges. The overhang is situated to facilitate an effective seal between adjacent SIPs, providing better thermal insulation. Additionally, the core of the panels has channels through the structure for the placement of joists, studs or rafters.

Clear (U.S. Pat. No. 6,079,175) describes a SIP of cementitious material for building structures. A lightweight fill material such as bottom ash, cement and water is poured between spaces of two outermost ribs, which is claimed to provide insulation, strength and also rigidity to the panel and therefore the structure the panel comprises. This SIP has the advantage of being constructed in remote or more barren areas as it is fairly inexpensive to create.

Pease (U.S. Pat. No. 6,725,616) prepares an insulated concrete wall either cast or built with blocks which is attached to reinforced insulated strips. The patentee indicates that users will require less time and labor in making insulated using the patentee's method of fixing reinforced rigid foam to the surface of a concrete wall.

Pease (U.S. Pat. No. 6,892,507) describes a method and apparatus for making an SIP with a rigid foam sheet. The rigid foam sheets have multiple grooves in which reinforcing strips are situated. The strips and rigid foam are then covered and bonded with a reinforcing sheet, the sheet providing both structural support and moisture retention.

Unfortunately, SIPs produced by the prior art are not effective for the formation of mine safe rooms, as lacking high strength including high compressive strength values. Furthermore, and more importantly, most conventional SIPs are not effective against high heat or open flames, either combusting or experiencing significant charring. In addition, the prior art SIPs generally lack a high strength to density ratio, making such SIPs ill suited for applications where a lightweight, insulating, yet strong panel is necessary for a safe room within a mine.

What is desired, therefore, is structural panel which is of a low density and has desirable thermal insulating properties, where the panel has a high strength and high strength to density ratio, and relatively non-combustible, and therefore useful for the construction of mine safe rooms. Indeed, a combination of characteristics, including strength to density ratios and compressive strength higher than contemplated in the prior art, as well as fire retardancy higher than contemplated in the prior art, have been found to be necessary for mine safe room structural applications.

SUMMARY OF THE INVENTION

The present invention provides a SIP which is uniquely capable of being used for the construction of mine safe rooms, and exhibiting a high strength to density ratio, and/or high resistance to combustion or charring. The inventive carbon foam structural insulated panel has a density, compressive strength and compressive strength to density ratio to provide a combination of strength and relatively light weight characteristics not heretofore seen. In addition, the carbon lattice work of the carbon foam resists both charring and combustion while maintaining structural integrity in the environmental conditions that mine safe rooms are designed to encounter in the event of a mine emergency. Furthermore, the carbon foam can be produced in a desired size and configuration and can be readily machined for a specific size for a structural insulated panel.

More particularly, the inventive structural carbon foam panel has a carbon foam core with a density of from about 0.05 to about 0.6 grams per cubic centimeter (g/cc), preferably with a compressive strength of at least about 2000 pounds per square inch (psi) (measured by, for instance, ASTM C695). An important characteristic for the carbon foam core when intended for use in the construction of mine safe rooms is the ratio of strength to density of over 1000 psi/(g/cc), more preferably from about 1000 to about 20,000 psi/(g/cc).

The inventive structural carbon foam panel should have the carbon foam core of a relatively uniform density both longitudinally and latitudinally for consistent thermal insulation and strength characteristics throughout the panel. Specifically, the carbon foam should have a relatively uniform distribution of pores in order to provide the required high compressive strength, the pores being relatively isotropic. In addition, the carbon foam core should have a total porosity of about 65% to about 95%, more preferably about 70% to about 95% to create the optimal strength to density ratio of the carbon foam structural insulated panel.

Advantageously, to produce the carbon foam core, a polymeric foam block, particularly a phenolic foam block, is carbonized in an inert or air-excluded atmosphere, at temperatures which can range from about 500° C., more preferably at least about 800° C., up to about 3200° C. to prepare the carbon foams for use in the structural carbon foam panels.

Prior to the addition of outerlayers, the carbon foam core can be treated with a variety of coatings to improve the overall performance of the carbon foam SIP. For example, an anti-oxidation coating can be applied to the carbon foam to increase the longevity of the SIP in highly oxidative conditions such as may be experienced in a mine emergency. Additionally, a fire retardant coating could also be applied to the carbon foam core to further increase the integrity of the carbon foam core and thus the SIP, when exposed to extreme temperatures.

The carbon foam core's first and second outerfaces are covered with a layer as the totality of the carbon foam SIP is generally planar is design. Optionally, one of the outer layers may be comprised of oriented strand board (OSB) while the other outer layer is comprised of a variety of gypsum board. Other outerlayers exist including, but not limited to a variety of thermoplastics, organic sheets, fiber impregnations, and composite boards.

The carbon foam core should be bound to the outer layers to construct the SIP. Binding may be through the use of materials such as adhesives or cements which create a chemical interaction between the outer layers and the carbon foam core. These include binders specific to carbon foam applications as well as general cements, mastics or high temperature glue. Optionally, mechanical materials can be used.

An object of the invention, therefore, is a structural carbon foam panel having characteristics which enable it to be used in a mine safe room.

Another object of the invention is a structural panel, with the structure of the carbon foam core having a sufficiently high compressive strength to be used for structural applications in the construction of mine safe rooms.

Still another object of the invention is structural carbon foam panel where the carbon foam core provides a fire retardant barrier which is extremely resistant to both combustion and charring.

Yet another object of the invention is a structural insulated panel foam which can be produced in a desired size and configuration, where the carbon foam core can be machined or joined with other similar carbon foam sheets to provide larger structural carbon foam panels.

Another object of the invention is to provide structural insulated panel which is resistant to environmental stresses including high humidity and severe temperature fluctuations.

Still another object of the invention is to provide a structural carbon insulated panel whereby the carbon foam core provides adequate thermal insulation to maintain a temperature differential between the exterior portion of the panel and the interior portion of the panel.

These aspects and others that will become apparent to the artisan upon review of the following description can be accomplished by providing a structural carbon foam panel with a carbon foam core having a ratio of compressive strength to density of at least about 1000 psi/(g/cc), especially a ratio of compressive strength to density of at least about 7000 psi/(g/cc), and up to about 20,000 psi/(g/cc). The inventive SIP has a carbon foam core with a density of from about 0.03 g/cc to about 0.6 g/cc, more preferably of from about 0.05 g/cc to about 0.15 g/cc, and advantageously a compressive strength of at least about 2000 psi, with a porosity of between about 65% and about 95%. Also, the thermal conductivity of the carbon foam core is from about 0.06 W/mK to about 0.3 W/mK.

Furthermore, the carbon foam core can be produced by carbonizing a polymer foam article, especially a phenolic foam, in an inert or air-excluded atmosphere. The phenolic foam precursor for the carbon foam core should preferably have a compressive strength of at least about 100 psi.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Figure 1:
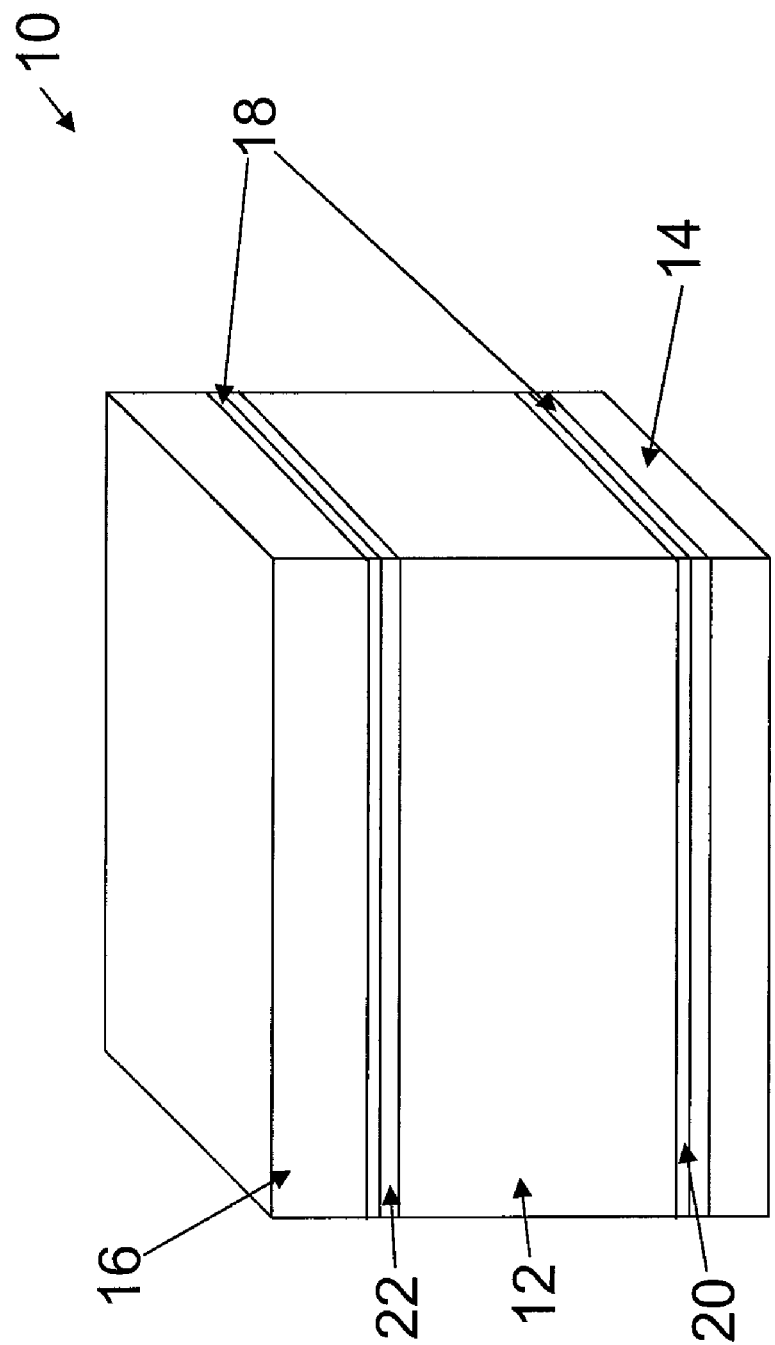
FIG. 1 is a view of a carbon foam structural insulated panel in accordance with an embodiment of the present invention.

The carbon foam used as the core for the inventive panel exhibits a density, compressive strength and compressive strength to density ratio to provide a combination of strength and relatively light weight characteristics not heretofore seen. In addition, the monolithic nature and bimodal cell structure of the foam, with a combination of larger and smaller pores, which are relatively spherical, provide a carbon foam which can be produced in a desired size and configuration and which can be readily machined.

The inventive carbon foam should have a relatively uniform distribution of pores in order to provide the required high compressive strength. In addition, the pores should be relatively isotropic, by which is meant that the pores are relatively spherical, meaning that the pores have, on average, an aspect ratio of between about 1.0 (which represents a perfect spherical geometry) and about 1.5. The aspect ratio is determined by dividing the longer dimension of any pore with its shorter dimension.

As noted, the foam should have a total porosity of about 65% to about 95%, more preferably about 70% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the carbon foam should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The bimodal nature of the foams provide an intermediate structure between open-celled foams and closed-cell foams, thus limiting the liquid permeability of the foam while maintaining a foam structure. Indeed, advantageously, the carbon foams should exhibit a permeability of no greater than about 3.0 darcys, more preferably no greater than about 2.0 darcys (as measured, for instance, by ASTM C577).

Typically, characteristics such as porosity and individual pore size and shape are measured optically, such as by use of an epoxy microscopy mount using bright field illumination, and are determined using commercially available software, such as Image-Pro Software available from MediaCybernetic of Silver Springs, Md.

Carbon foams in accordance with the carbon foam core of the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde:phenol ratio which can vary, but is preferably about 2:1. Free phenol and formaldehyde content should be low, although urea may be used as a formaldehyde scavenger.

The foam is prepared by adjusting the water content of the resin and adding a surfactant (e.g., an ethoxylated nonionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p,p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the carbon foam should have an initial density which mirrors the desired final density for the carbon foam which is to be formed. In other words, the polymeric foam should have a density of about 0.1 to about 0.6 g/cc, more preferably about 0.1 to about 0.4 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density of at least about 7000 psi/(g/cc), more preferably at least about 8000 psi/(g/cc). The carbon foam has a relatively uniform distribution of isotropic pores having, on average, an aspect ratio of between about 1.0 and about 1.5.

Optionally, the carbon foam core of the inventive SIP can be created for an increased oxidation resistance by the specific inclusion of compounds solely for improving the oxidation resistance of the carbon foam. Such solid oxidation inhibiting additives include ammonium phosphate, aluminum phosphate, zinc phosphate or boric acid. An additional characteristic of the oxidation inhibiting additives is that the additives can be added during either the resin production stage or the phenolic foam forming stage of carbon foam production. Using either method, the final carbonization of the phenolic foam results in phosphorous or boron retained within the carbon foam structure that reduces the rate of oxidation of the carbon foam. Specifically, phosphorous or boron retained in the final carbon foam product from about 0.01% to about 0.5% by weight reduces the rate of oxidation by over 50%.

Alternatively, the carbon foam product can be treated with an oxidation-inhibiting agent after the completion of the carbonization process but prior to the integration in the SIP. The preferred method would be to impregnate the carbon foam with aqueous solutions of phosphorous-containing materials such as ammonium phosphate, phosphoric acid, aluminum phosphate, or zinc phosphate, followed by a heat treatment to about 500° C. to simultaneously remove the water and fix the phosphorous to the carbon. Additionally, water-soluble boron compounds such as boric acid can be introduced in the above manner to create an oxidation-resistant carbon foam product.

The polymeric foam used as the starting material in the production of the carbon foam core should have an initial density which mirrors the desired final density for the carbon foam which is to be formed. In other words, the polymeric foam should have a density of about 0.03 g/cc to about 0.6 g/cc, more preferably about 0.05 g/cc to about 0.4 g/cc, most preferably about 0.05 g/cc to about 0.15 g/cc. The cell structure of the polymeric foam should be closed with a porosity of between about 65% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, and, significantly, a ratio of strength to density of at least about 1000 psi/(g/cc), more preferably at least about 7000 psi/(g/cc), with an upper limit of about 20,000 psi/(g/cc). The carbon foam has a relatively uniform distribution of isotropic pores having, on average, an aspect ratio of between about 1.0 and about 1.5.

Referring now to FIG. 1, there is revealed a partial side view of a SIP 10 with a carbon foam core 12 in accordance with one of the embodiments of the present invention.

Carbon foam core 12 and SIP 10 are generally planar, though can be constructed to meet a variety of specifications. Optionally, carbon foam core 12 can be curved or possess rounded edges through either machining or molding to best fit the desired mine safe room application.

SIP 10 includes both the first outer layer 14 and second outer layer 16 situated on the opposite outer surfaces of carbon foam core 12. As with carbon foam core 12 and SIP 10, both the first outer layer 14 and the second outer layer 16 can possess a variety of shapes for the desired application. The first outer layer 14 and the second outer layer 16 can comprise similar or completely different materials depending upon the specific structural application of the SIP. These materials include typical construction materials such as plywood, oriented strand board, drywall, gypsum, cement composites, wood composites, or a variety of other rigid organic or inorganic construction boards. Furthermore, first outer layer 14 and second outer layer 16 can also be impregnations of the above materials or include thermoplastics, resins, carbon composites, ceramic composites or a variety of other artificially created materials. In specific structural applications requiring substantial rigidity or abrasion resistance, a variety of metal compounds can be used to comprise both the first outer layer 14 and the second outer layer 16. In cases of aircraft construction these layers can include thin metal skins around carbon foam core 12, or in the case of rigid watercraft, outer layer 14 and outer layer 16 can include harden metal composites. Obviously, the selection of first outer layer 14 and the second outer layer 16 will be based on the necessary tensile strength and fire retardant properties of the specific SIP 10. Furthermore, first outer layer 14 and second outer layer 16 can be of two different materials where the use of the SIP 10 necessitates such properties. For example, in residential building structures the first outer layer 14 may be comprised of a thermoplastic which would be fairly impervious to environmental stresses while the second outer layer 16 could be gypsum board or aesthetically pleasing paneling more visible to the interior of the residential building. Other materials which can comprise either one or both of the outer layers 14 and 16 include but are not limited to the following: paper, reinforced paper composites, oriented strand board, fiberboard, drywall, gypsum, gypsum composites, wood, wood composites, plywood, thermoplastics, plastic composites, resins, metals, metal alloys, metal composites, and combinations thereof.

In an additional embodiment, sheets of compressed particles of exfoliated graphite are incorporated into the SIP, situated in contact with the carbon foam core. These graphite sheets can either be on one side or both sides of the carbon foam core, in between the outer layers and the carbon foam core. Suitable sheets of compressed particles of exfoliated graphite (often referred to in the industry as "flexible graphite") can be produced by intercalating graphite flakes with a solution containing, e.g., a mixture of nitric and sulfuric acids, expanding or exfoliating the flakes by exposure to heat, and then compressing the exfoliated flakes to form coherent sheets. The production of sheets of compressed particles of exfoliated graphite is described in, for instance, U.S. Patent Application Publication No. US-2005-0079355-A1, the disclosure of which is incorporated herein by reference.

By the incorporation of sheets of compressed particles of exfoliated graphite with the carbon foam core, a superior fire retardant structure is created. The anisotropic thermal properties of a compressed exfoliated graphite sheet on one or both opposing sides of the carbon foam core provide significant improvements in thermal management allowing the SIP to be used for in the mine safe room as a fire retardant material.

The first outer layer 14 and the second outer layer 16 are connected to the carbon foam core 12 through a bonding or adhesive material 18. This bonding or adhesive material 18 can include chemical bonding agents suitable for specific applications ranging from high temperature conditions to exposure to an acidic environment. Different chemical bonding materials include adhesives, glues, cement, and mastic. Optionally, the first outer layer 14 and second outer layer 16 can be attached to the carbon foam core 12 through mechanical materials. While this method does affect the integrity and uniform characteristics of carbon foam core 12, mechanical connects are available for little cost and are extremely quick to complete. Various mechanical attaching methods of attaching both the first outer layer 14 and the second outer layer 16 to the carbon foam core 12 include but are not limited to nails, studs, screws, braces, struts, fasteners, staples, and combinations thereof. Additionally, the first outer layer 14 and the second outer layer 16 can be compressedly bound to the carbon foam core through a series of high compression treatments of the outer layers 14 and 16 to the carbon foam core. While less permanent than either the mechanical or chemical attachment options, this attach type introduces no extra chemical compounds or weakens the structural integrity of carbon foam core 12 as does either the chemical or mechanical attachment methods.

First coating 20 and second coating 22 are both optional and applied to carbon foam core 12 to alter the carbon foam core's 12 properties. Specifically, first coating 20 and second coating 22 can be identical or different, depending upon the conditions and necessary properties of the carbon foam core 12. For example, first coating 20 and second coating 22 can both be a fire retardancy improvement coating to improve the fire retardant properties of the carbon foam core 12. Additionally, the first coating 20 could be an oxidation resistant coating where as the second coating 22 could be a fire retardant coating where one side of the SIP 10 would be more likely exposed to an oxidation atmosphere while the other side of the SIP 10 would have a greater likelihood of being exposed to fire. Also, first coating 20 and second coating 22 are optionally applied; for many applications of SIP 10, neither first coating 20 nor second coating 22 are necessary.

With carbon foam core 12 as the insulating layer in SIP 10, the SIP 10 has an inherent fire retardant/resistant property. As other insulating materials merely preclude oxygen from the structural insulating panel's structure, carbon foam core 12 is extremely resistant to both combustion or charring. Specifically, carbon foam core 12 is mainly linked carbons with relatively few other elements present within its foam structure. As such, little exists for combustion, other than the simple oxidation of the carbon of carbon foam core 12. For this oxidation to occur, temperatures have to reach rather extreme temperatures, making carbon foam core 12 very suitable for both commercial and residential structures where fire retardant structures are required.

Similarly, carbon foam core 12 is resistant to many environmental stresses including insects, humidity, and heat. Carbon foam is an extremely hard substance, lending itself poorly to insect habitation while its chemical and structural properties are virtually not altered by a change in humidity. Furthermore, first outer layer 14 and second outer layer 16 can be selected for the specific environmental applications in the mine in which SIP 10 will be located.

Finally, SIP 10 and its superior strength to density ratio as well as fire retardancy make SIP 10 suitable for the construction of mine safe rooms. Notably, SIP 10 is quite useful in these applications, since it is a low density yet strong material, having exceptional fire retardant properties. Furthermore, SIP 10 with carbon foam core 12 possesses desirable thermal resistance thus helping maintain a controlled climate within the room, which can be critical if miners are trapped in the room for an extended period, especially if there is a fire in the mine.

Accordingly, by the practice of the present invention, SIPs with carbon foam cores, having heretofore unrecognized characteristics are prepared for use in mine safe rooms. These SIPs with carbon foam cores exhibit exceptionally high compressive strength to density ratios, much improved fire retardance and environmental stability, making them uniquely effective at such applications.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A mine safe room comprising a structural insulated panel which comprises a carbon foam material with a bimodal pore distribution with at least about 90% of the pore volume about 10 to about 150 microns in diameter and at least about 1% of the pore volume about 0.8 to about 3.5 microns, the carbon foam material exhibiting a permeability of no greater than about 3.0 darcys and the structural insulated panel further comprising a layer which comprises at least one sheet of compressed particles of exfoliated graphite on at least one surface of the carbon foam material.

2. The mine safe room of claim 1 further comprising: a first outer layer bound to the layer which comprises at least one sheet of compressed particles of exfoliated graphite; and a second outer layer bound to a second surface of the carbon foam material.

3. The mine safe room of claim 1 wherein the carbon foam material has a ratio of compressive strength to density of from about 1000 psi/(g/cc) to about 20,000 psi/(g/cc).

4. The mine safe room of claim 1 wherein the carbon foam material has a thermal conductivity of from about 0.06 W/mK to about 0.3 W/mK.

5. The mine safe room of claim 1 wherein the carbon foam material includes a coating on the carbon foam's exterior surface.

6. The mine safe room of claim 5 wherein the coating improves fire retardancy of the carbon foam material.

7. The mine safe room of claim 5 wherein the coating improves oxidation resistance of the carbon foam material.

8. The mine safe room of claim 2 wherein the outer layers are selected from the group consisting of paper, reinforced paper composites, oriented strand board, fiberboard, drywall, gypsum, gypsum composites, wood, wood composites, plywood, thermoplastics, plastic composites, resins, metals, metal alloys, metal composites, and combinations thereof.

9. The mine safe room of claim 8, wherein the outer layer comprises fibers.

10. The mine safe room of claim 1, which comprises at least one sheet of compressed particles of exfoliated graphite on both surfaces of the carbon foam material.

11. The mine safe room of claim 10 further comprising: a first and second outer layer, each bound to one of the layers which comprise at least one sheet of compressed particles of exfoliated graphite.

* * * * *